Figure 1:
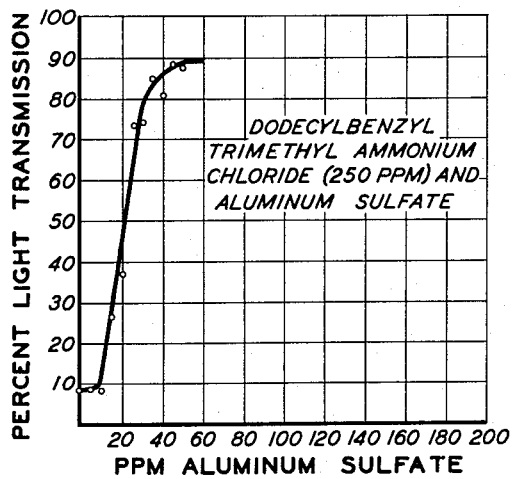

COMPARATIVE TURBIDITY OF AQUEOUS QUATERNARY AMMONIUM GERMICIDE DISPERSIONS CONTAINING WATER-SOLUBLE INORGANIC ALUMINUM SALTS

INVENTORS:
John L. Darragh
Gordon B. Johnson

Patented Sept. 7, 1954

2,688,583

UNITED STATES PATENT OFFICE 2,688,583

WATER DISPERSIBLE QUATERNARY AMMONIUM GERMICIDE AND ALUMINUM SALT COMPOSITIONS

John L. Darragh, Alamo, and Gordon B. Johnson, Berkeley, Calif., assignors to California Research Corporation, San Francisco, Calif., a corporation of Delaware Application September 29, 1950, Serial No. 187,484

3 Claims. (Cl. 167—30)

This invention relates to improved water dispersible germicidal compositions and, more particularly, to quaternary ammonium germicidal compositions capable of producing clear aqueous dispersions.

Quaternary ammonium compounds are well known as germicides and are being used widely in the control of various micro-organisms such as bacteria, fungae, algae, and the like. These compounds are very commonly employed in the form of dispersions, solutions, and the like, with water wherever the control of micro-organisms such as bacteria, fungae, algae, etc. is desired.

Quaternary ammonium compounds upon addition to water ionize to release a lipophilic or oil-soluble group as a positively charged cation. Many different quaternary ammonium compounds possessing varying degrees of effectiveness as germicidal agents have been prepared by modifying the chemical structuer of this cationic oil-soluble group. In general, these quaternary ammonium compounds, especially those possessing high germicidal activity, have a tendency to produce cloudy dispersions upon being added to water. This is particularly so when the water contains contaminants of the type usually present in domestic and industrial water sources.

We have found that a germicidal composition comprising a quaternary ammonium germicide and a small amount of an inorganic water-soluble aluminum salt is capable of producing clear aqueous dispersions throughout various concentrations and under conditions which make it impossible to obtain clear aqueous dispersions from the quaternary ammonium germicide alone.

We have further found that aqueous dispersions of quaternary ammonium germicides which are characterized by a cloudy appearance may be clarified by the addition of a small amount of an inorganic water-soluble aluminum salt to said aqueous dispersion.

According to our invention, the quaternary ammonium germicide and inorganic water-soluble aluminum salt may be combined in the form of a dry mixture. This mixture upon addition to water will produce clear aqueous dispersions which will remain free of cloudiness even though the water subsequently becomes contaminated with organic material of the type ordinarily causing the formation of clouds in quaternary ammonium germicide dispersions. The quaternary ammonium germicide and water-soluble inorganic aluminum salt compositions may also be in the form of concentrated aqueous dispersions suitable for addition to water.

The quaternary ammonium germicides may be any of the several various types which fall within the generic term. These compounds are generally characterized by the formulae

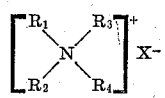

wherein at least one of the radicals $R_1$, $R_2$, $R_3$ and $R_4$ attached to the nitrogen atom is a hydrophobic radical of aliphatic, unsaturated aliphatic, cycloaliphatic, aryl, aralipathic, or aliphatic aryl nature, and containing from 6 to 26 carbon atoms. These radicals may be long-chain alkyl, long-chain alkenyl, cycloalkyl, long-chain alkoxy, aryl, long-chain alkylaryl, halogen-substituted long-chain alkylaryl, long-chain alkylphenoxyalkyl, aralkyl, etc. The remaining radicals on the nitrogen atom other than the hydrophobic radicals may be substituents of hydrocarbon structure ordinarily containing a total of no more than about 12 carbon atoms.

Although any quaternary ammonium germicides including those falling within the above broad description may be used in producing the new and useful germicidal compositions according to our invention, it has been found that the long-chain alkylarylmethyl quaternary ammonium germicides are particularly suitable. These compounds may be illustrated by the type formula

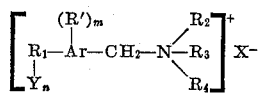

wherein $R_1$ is an alkyl group of from about 8 to 18 carbon atoms, Ar is an aryl hydrocarbon nucleus, R' is a methyl radical, $m$ is from 0 to 4, Y is a halogen, $n$ is from 0 to 8, $R_2$, $R_3$ and $R_4$ are substituents of hydrocarbon structure containing a total of no more than about 12 carbon atoms, and X is a salt-forming anionic radical which may be the same as Y. Specific examples of compounds within this description are dodecylbenzyl trimethyl ammonium chloride, nonylnaphthylmethyl pyridinium chloride, dodecyltolylmethyl trimethyl ammonium chloride, tetrachlorododecylbenzyl trimethtyl ammonium chloride, dodecylbenzyl trimethyl ammonium methosulfate, etc.

The quaternary ammonium germicides may be utilized either in their dry form or as concentrated aqueous solutions. Particularly suitable concentrates may contain from about 20 to 80% by weight active quaternary in water, preferred examples of which are mixtures containing approximately equal parts by weight of water and long-chain alkylarylmethyl quaternary ammonium germicides such as dodecylbenzyl trimethyl ammonium chloride, etc.

The above long-chain alkylarylmethyl quaternary ammonium salts and aqueous concentrates thereof, although characterized in having unusually high germicidal activity, display an unusual tendency to form a very definite cloud upon addition to water. It is this group of quaternary ammonium germicides which is, therefore, improved to the greatest extent upon incorporation into compositions pursuant to the present invention.

Among the water-soluble inorganic aluminum salts which may be used in the improved germicidal compositions in accordance with our discovery are aluminum sulfate, aluminum chloride, aluminum ammonium sulfate, aluminum nitrate, aluminum potassium sulfate, aluminum sodium sulfate, etc. Aluminum sulfate is preferred in particular because it is both highly effective in the production of clear aqueous dispersions of quaternary ammonium germicides and is also readily available.

The quaternary ammonium germicide and water-soluble inorganic salt of aluminum may be combined in various proportions to produce the desired composition adapted to any particular application. Ordinarily, a major proportion of quaternary ammonium germicide will be employed and the water-soluble inorganic aluminum salt to be used will be present in an amount sufficient to maintain the quaternary ammonium germicide in clear aqueous dispersion. For example, in the mixture of quaternary ammonium germicide and water-soluble inorganic aluminum salt, according to this invention, the proportions of aluminum salt may range from about 1% to as high as about 50% by weight based on the amount of quaternary ammonium germicide. Under more commonly encountered conditions such as where the quaternary ammonium germicide and aluminum salt composition are to be used for sanitizing water in germicidal rinse solutions, swimming pools, ponds, etc., the aluminum salt is preferably present in proportions ranging from about 4% to about 30% by weight of the quaternary ammonium germicide. When as previously mentioned, the water-soluble inorganic aluminum salt is to be added to an aqueous dispersion of the quaternary ammonium germicide, the proportions may range from just a small amount sufficient to inhibit the formation of cloud or to dispel any cloud already present up to substantial amounts capable of maintaining the quaternary ammonium germicide in clear dispersion over a long period of time. Larger amounts are obviously contemplated where an unusual degree of water contamination renders the production of a clear aqueous dispersion more difficult. Concentrated aqueous dispersions of quaternary ammonium germicide and water-soluble inorganic aluminum salt compositions may be prepared using any suitable amount of water and similar proportions of quaternary and aluminum salt as set out in the foregoing disclosure.

The following examples illustrate the preparation and testing of various quaternary ammonium germicide and water-soluble inorganic aluminum salt compositions in accordance with our invention. They are not to be construed as limiting, however, either in respect to the particular concentration of quaternary ammonium germicide or as to the specific aluminum salt used.

EXAMPLE 1

An aqueous dispersion containing 250 p. p. m. of dodecylbenzyl trimethyl ammonium chloride as a germicide was prepared from a domestic tap water supply. Within a matter of a few minutes the dispersion became densely clouded and remained so, although allowed to stand for a long period of time.

A second aqueous dispersion containing 250 p. p. m. dodecylbenzyl trimethyl ammonium chloride and 250 p. p. m. aluminum sulfate was prepared from the same domestic tap water supply. The resultant dispersion was clear and remained so upon standing.

EXAMPLE 2

Lauryl dimethylbenzyl ammonium chloride was mixed with domestic tap water as noted in Example 1 to give an aqueous dispersion having a concentration of about 250 p. p. m. of the quaternary. As in Example 1, a dense cloud appeared in the dispersion within a few minutes. This cloudy appearance prevailed, although the dispersion was allowed to stand for a considerable period of time.

A similar dispersion of lauryl dimethylbenzyl ammonium chloride was prepared with the exception that it contained about 20 p. p. m. of aluminum sulfate. This dispersion was completely clear.

A number of preparations similar to those illustrated in the above examples was made using various types of quaternary ammonium germicides as well as different proportions of the above listed water-soluble inorganic aluminum salts. Concentrations of about 250 p. p. m. of the quaternary ammonium germicide were employed in these preparations, since those concentrations are within the range generally used in sanitizing operations. The turbidity or cloud in each of the resultant dispersions was measured on a standard turbidimeter and the readings expressed in terms of per cent light transmitted through the dispersion. Representative data obtained in these experiments are set out in the table which follows.

TABLE

*Comparative turbidity of aqueous quaternary ammonium germicide dispersions containing water-soluble inorganic aluminum salts*

| Quaternary Ammonium Compound (Concentration=250 p. p. m.) | Water-Soluble Inorganic Aluminum Salt | Concentration of aluminum salt, p. p. m. | Percent Light Transmission |
|---|---|---|---|
| Dodecylbenzyl trimethyl ammonium chloride. | Aluminum sulfate. | 0 | 8.5 |
| Do | do | 5 | 8.5 |
| Do | do | 10 | 8.0 |
| Do | do | 15 | 26.5 |
| Do | do | 20 | 37.3 |
| Do | do | 25 | 73.5 |
| Do | do | 30 | 74.5 |
| Do | do | 35 | 85.2 |
| Do | do | 40 | 81.0 |
| Do | do | 45 | 88.5 |
| Do | do | 50 | 87.5 |
| Do | Aluminum chloride. | 0 | 9.7 |
| Do | do | 10 | 67.4 |
| Do | do | 20 | 87.6 |
| Do | do | 30 | 84.5 |
| Do | do | 40 | 87.5 |
| Do | do | 50 | 86.1 |
| Do | do | 100 | 95.6 |
| Methyldodecylbenzyl trimethyl ammonium chloride. | Aluminum sulfate. | 0 | 23.5 |
| Do | do | 10 | 26.1 |
| Do | do | 20 | 94.6 |
| Do | do | 30 | 96.5 |
| Do | do | 40 | 97.0 |
| Do | do | 50 | 95.7 |
| Lauryl Dimethybenzyl ammonium chloride. | do | 0 | 33.1 |
| Do | do | 10 | 89.0 |
| Do | do | 20 | 88.0 |

Figure 2:
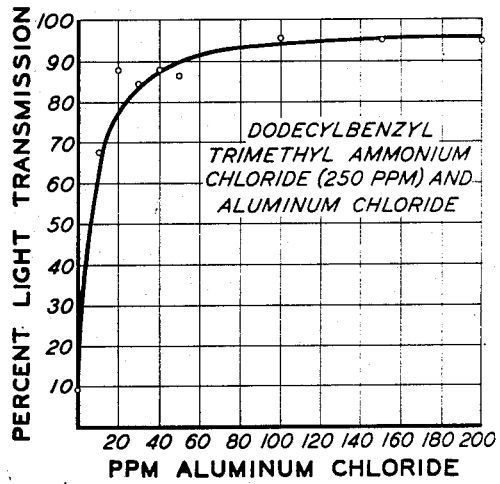
Figure 3:
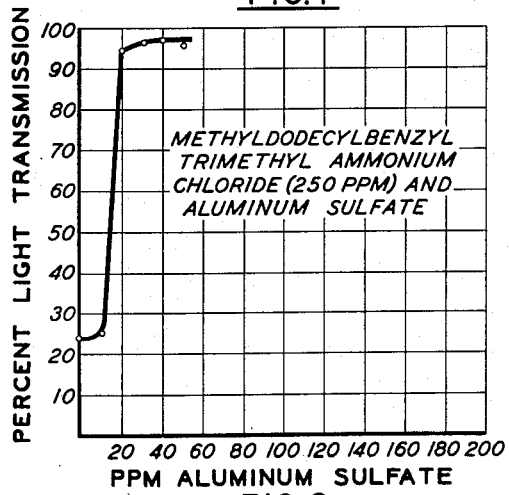
Figure 4:
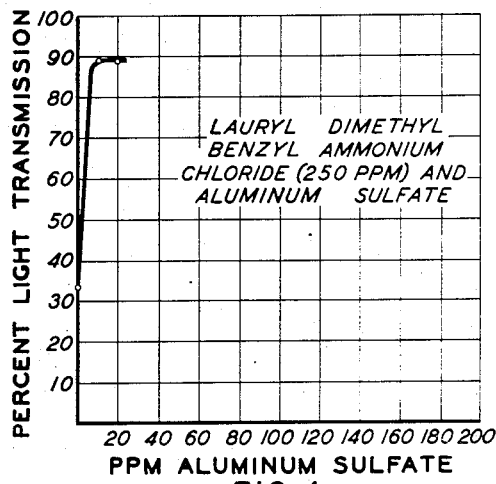

To facilitate analysis of the results in the above table, curves were prepared for each of the quaternary ammonium germicide and water-soluble inorganic aluminum salt compositions tested. These curves were prepared by plotting the concentration of the water-soluble inorganic aluminum salt against the per cent light transmission through the dispersion. On reference to the curve in Figure 1 of the accompanying drawing, it may be seen that less than about 8.5% light could be transmitted through a dispersion of 250 p. p. m. dodecylbenzyl trimethyl ammonium chloride alone in domestic tap water. Upon the inclusion of about 50 p. p. m. of aluminum sulfate, equivalent to about 20% by weight of the quaternary, a light transmission of more than 88% was obtained. The curves of Figures 2, 3 and 4 are substantially the same as those of Figure 1 and show that similar results may be obtained with other quaternaries such as methyldodecylbenzyl trimethyl ammonium chloride and lauryl dimethylbenzyl ammonium chloride, as well as other aluminum salts such as aluminum chloride, for example.

In summing up the results of the above experiments, it is readily apparent that the quaternary ammonium germicide and water-soluble inorganic aluminum salt compositions, according to applicants' invention, are greatly superior to the quaternary ammonium germicides alone in the production of clear aqueous dispersions. The turbidity and cloudy dispersions formed when the quaternary alone is added to water from commonly used sources of supply are substantially avoided. The resulting clear disspersions are particularly desirable in sanitizing operations in general as, for example, when used in germicidal rinse solutions, swimming pools, etc.

From the foregoing discussion and illustrations of the invention it will be apparent that the invention relates broadly to compositions containing quaternary ammonium germicides and water-soluble inorganic aluminum salts in general. Other materials such as unreacted ingredients, disinfectants, buffering agents, dyes, etc. may be present within the scope of this invention.

We claim:

1. A germicidal composition adapted to produce clear aqueous dispersions upon addition to tap water which consists essentially of dodecylbenzyl trimethyl ammonium chloride and from about 4 to about 30 per cent, by weight, based on the amount of quaternary ammonium chloride, of an aluminum salt of the group consisting of aluminum sulfate and aluminum chloride.

2. A germicidal composition adapted to produce clear aqueous dispersions upon addition to tap water which consists essentially of dodecylbenzyl trimethyl ammonium chloride and from about 4 to about 30 per cent, by weight, based on the amount of quaternary ammonium chloride, of aluminum sulfate.

3. A germicidal composition adapted to produce clear aqueous dispersions upon addition to tap water which consists essentially of dodecylbenzyl trimethyl ammonium chloride and from about 4 to about 30 per cent, by weight, based on the amount of quaternary ammonium chloride, of aluminum chloride.

References Cited in the file of this patent

UNITED STATES PATENTS

| Number | Name | Date |
|---|---|---|
| 1,658,974 | La Porte et al. | Feb. 24, 1928 |
| 2,190,133 | Epstein et al. | Feb. 13, 1940 |
| 2,569,408 | De Benneville et al. | Sept. 25, 1951 |

OTHER REFERENCES

Hyamines, 1622 and 10–X, Bulletin of Rohn & Haas Co., Wash. Square, Phila. 5, Pa., Jan. 28, 1948.

U. S. Dispensatory, 24th ed., 1947, pages 142, 143.